(Model.)

F. SCHNEIDER.
OPEN LINK.

No. 247,952.  Patented Oct. 4, 1881.

WITNESSES:
Chas Nida
C. Sedgwick

INVENTOR:
F. Schneider
BY Munn &co
ATTORNEYS.

UNITED STATES PATENT OFFICE.

FREDRICK SCHNEIDER, OF PAGOSA SPRINGS, COLORADO.

OPEN LINK.

SPECIFICATION forming part of Letters Patent No. 247,952, dated October 4, 1881.

Application filed April 20, 1881. (Model.)

*To all whom it may concern:*

Be it known that I, FREDRICK SCHNEIDER, of Pagosa Springs, in the county of Conejos and State of Colorado, have invented a new and Improved Open Link, of which the following is a specification.

The object of my invention is to provide a new and improved open link which is simple in construction and effective and convenient in use.

The invention consists in an open link formed of two U-shaped sections provided with internal opposite projections at the ends, which sections are united by a connecting-plate provided with recesses in the longitudinal edges to receive the projections at the ends of the U-shaped sections, all these parts being held together by a flat sliding cap and a split spring, both passing through said cap and the connecting-plate.

Figure 1:
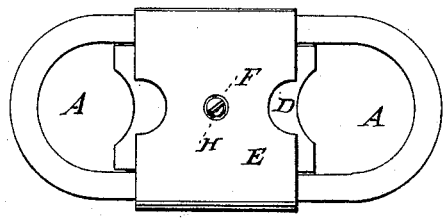
Figure 2:
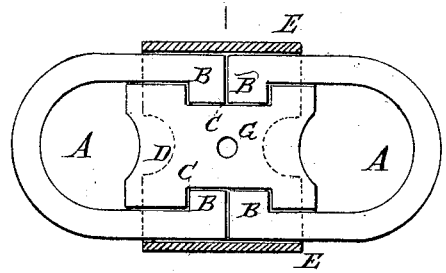
Figure 3:
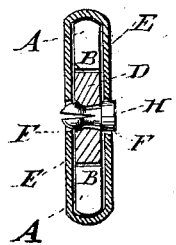

In the accompanying drawings, Figure 1 is a plan view of my improved open link. Fig. 2 is a horizontal sectional elevation of the same, showing the upper side of the cap removed. Fig. 3 is a cross-sectional elevation on the line *x x*, Fig. 2.

Similar letters of reference indicate corresponding parts.

The U-shaped links or sections A A are provided with opposite internal projections, B B, at the ends, which projections fit into the recesses C C in a connecting-plate, D, of the same width as the interior of the U-shaped sections A. The projections B B may be of greater or less depth, as may be desired, and the recesses C must be of such size as to be filled by two adjoining projections, B. A flat cap, E, fits over the links or sections A A, and is provided with apertures F, corresponding with a like aperture, G, in the plate D, into which apertures a spring-bolt, H, or other like suitable device, is passed.

The open link is used as follows: The open link is taken apart and one of the links or sections A is passed through the end link or ring of a chain or like device. The connecting-plate D is then fitted into said section A, the cap E is passed over it and drawn back as far as possible, and finally the other link or section A, which has been passed through the end link or ring of the other chain, is also fitted into the connecting-plate D. The cap E is then pushed forward until the apertures F F correspond in position with the aperture G, upon which the spring-bolt H or other like suitable device is passed into said apertures, thereby holding the parts together.

Having thus described my invention, what I claim as new, and desire to secure by Letters Patent, is—

1. An open link made substantially as herein shown and described, and consisting of two U-shaped sections or links with internal projections at the ends, of a recessed connecting-plate and of a cap or plates for holding the parts together, as set forth.

2. The combination, with the U-shaped sections or link A, provided at the ends with the internal projections, B B, of the recessed connecting-plate D, the sliding cap E, and the split spring-bolt H or like device, substantially as herein shown and described, and for the purpose set forth.

FREDRICK SCHNEIDER.

Witnesses:
 ASA. H. PANGBORN,
 ALECK BLAIR.